July 17, 1951  D. McBURNEY ET AL  2,561,063
ADHESIVE TAPE
Filed Aug. 14, 1946
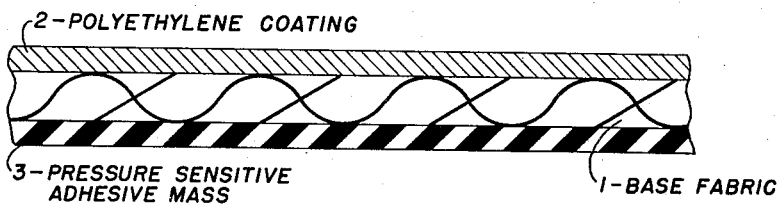
Dorman McBurney
Raymond E. Thomas        INVENTORS
BY
Frank C Hilberg          ATTORNEY Patented July 17, 1951

2,561,063

UNITED STATES PATENT OFFICE 2,561,063

ADHESIVE TAPE

Dorman McBurney, Swarthmore, Pa., and Raymond E. Thomas, Newburgh, N. Y., assignors to E. I. du Pont de Nemours & Company, Wilmington, Del., a corporation of Delaware Application August 14, 1946, Serial No. 690,548

2 Claims. (Cl. 117—68.5)

This invention relates to adhesive tape, and more particularly to cleanable backing for adhesive tape, and still more particularly to cleanable backing for adhesive tape for medical and surgical use.

Heretofore, it has been customary to make adhesive tape by applying a pressure sensitive adhesive rubber mass directly on one side of a thin sheeting; however, such a material has the disadvantage of becoming soiled very rapidly and must be replaced frequently by clean surgical tape, which usually has a deleterious effect on the wound. More recently it has been proposed to render the fabric waterproof and cleanable by applying a film of a plasticized cellulose derivative composition on the side of the fabric opposite the rubber mass. This material represents marked advantages over the non-treated fabric with respect to resistance to soiling and cleanability. It has also been proposed to formulate the cellulose derivative coating in order that the adhesive tape can be sterilized without the cellulose derivative coating decomposing under conditions necessary to render the adhesive tape sterile. Most of the common plasticizers for cellulose derivatives have a deleterious effect on the rubber adhesive mass opposite the cellulose derivative coating. The effect of the cellulose derivative plasticizer on the rubber adhesive mass is particularly pronounced when the material is stored in roll form prior to use where there is direct contact of the plasticized cellulose derivative coating, and the rubber adhesive mass.

This invention has as an object the provision of a cleanable, waterproof backing material for pressure sensitive adhesive tape or surgical plaster. A further object is the provision of a chemically inert, flexible, cleanable and waterproof coating for adhesive tape backing which does not contain a plasticizer and is innocuous to the rubber adhesive mass applied on the side of the backing opposite the flexible waterproof and cleanable coating. A still further object is the provision of a coating for adhesive tape backing which will not decompose under conditions necessary to render the adhesive tape sterile.

The objects of this invention are accomplished by applying to one side of a woven or non-woven flexible base material a suitable cleanable, waterproof, flexible coating comprising polymerized ethylene as the major film-forming ingredient, together with pigments if desired for the purposes of coloring the coating, and applying to the opposite side of the base material suitable pressure-sensitive adhesive composition.

In the drawing the single figure represents a diagrammatic cross section of a portion of material prepared according to the present invention. In this figure, 1 represents the base fabric, 2 indicates the polymerized ethylene coating, and 3 represents a conventional pressure-sensitive adhesive composition.

The invention is best illustrated by a description of the preferred embodiment but it is to be understood that the invention is not limited thereto except as defined in the appended claims.

EXAMPLE I

A plain weave cotton fabric weighing approximately 3.78 ozs./linear yard—40 inches wide, and having a thread count of 80 warp and 80 filler which has been bleached by any conventional method well known in the art of bleaching fabrics was made water repellent in accordance with the disclosure in U. S. Patent 2,118,101, issued May 24, 1938, to E. H. Nollau et al., or by the process disclosed in U. S. Patent 2,187,563, issued January 16, 1940, to R. E. Thomas. While the water repellent treatment is preferred, it is not an essential part of the invention. After the fabric was rendered water repellent in the conventional manner, there was applied to one side by means of a doctor knife a plurality of coats of the following coating composition:

Waterproof coating

| | Per cent |
|---|---|
| Polymerized ethylene | 10 |
| Titanium dioxide pigment (2 parts) dispersed in polymerized ethylene (1 part) | 30 |
| Toluol | 60 |

The polymerized ethylene may be prepared in accordance with U. S. Patent 2,153,553, issued April 11, 1939, to E. W. Fawcett et al. The pigment was dispersed in the polymerized ethylene by a conventional method of milling pigments in film-forming compositions as is well known in the rubber industry. The polymerized ethylene-pigment mass in which the pigment is thoroughly dispersed in the ratio of 2 parts of pigment to 1 part of polymerized ethylene was dissolved in the toluol at a temperature of 180–190° C. At this elevated temperature the solution was complete and of a fluid nature. At lower temperatures the coating composition will set to a solid gel, and it is therefore necessary to maintain the composition at elevated temperatures during the application to the fabric backing. The composition was applied by means of the apparatus disclosed in U. S. Patent 2,107,276, issued February 8, 1938, to W. T. Anderson. Approximately 1.5 ounces of non-volatile components were deposited per square yard. After each successive coat the coated fabric was passed through a heated chamber such as disclosed in U. S. Patent 2,107,275, issued February 8, 1938, to W. T. Anderson et al., to remove the volatile solvent. After the final coat had been applied and suitably dried, the material was passed through an embossing apparatus to emboss a pattern on the coating surface. The purpose of the embossing operation is twofold: first, to enhance the appearance, and second, to improve the bond of the coating to the base fabric. In the embossing operation one of the embossing elements was a heated steel engraved roll and the other was a paper roll carrying a design counter to the steel roll. Embossing plates may also be used in which case an engraved, heated, steel plate is pressed against the coated fabric supported by a fibrous embossing bed. During the embossing operation a pressure of approximately 40 to 50 tons was applied to the axis of the heated steel roll to force it against the paper counter roll. The temperature of the steel roll was approximately 225° C.

It is sometimes desirable to treat the embossed material to restore the fibers of the base fabric to their condition prior to the embossing operation in order to prepare the uncoated side of the fabric for the application of the rubber pressure-sensitive adhesive mass. This may be accomplished by the method set forth in U. S. Patent 2,137,969, issued November 22, 1938 to R. E. Thomas, wherein the embossed fabric is subjected to an aqueous treatment followed by drying under suitable conditions, for example, a tenter frame. The aqueous treatment of the coated fabric after embossing is disclosed and claimed in the aforementioned U. S. Patent 2,137,969, and forms no part of this invention per se.

To the uncoated side of the material thus prepared was applied by spreading a suitable quantity of a conventional pressure-sensitive rubber adhesive mass by any desired method of application. Suitable compositions for the pressure-sensitive adhesive mass are disclosed in U. S. Patent 2,137,969. Other examples of such compositions and their mode of application are also disclosed in "The Chemical Formulary" by Bennett, volume 2, page 366, D. Van Nostrand Co., New York (1935), and "The Pharmacopoeia of the United States of America"—eleventh decennial revision, Mack Printing Co., Easton, Pa. (1936).

An adhesive tape material made in accordance with the procedure outlined above was packaged in conventional metal containers and after 18 months of room temperature storage, the rubber adhesive mass was in a satisfactory condition, and the polymerized ethylene coating showed no signs of deterioration.

EXAMPLE II

The white waterproof coating of Example I can be replaced with the following unpigmented coating composition where a colorless transparent coating is desired:

*Waterproof coating*

| | Per cent |
|---|---|
| Polymerized ethylene | 25 |
| Toluol | 75 |

The above coating was prepared by dissolving the polymerized ethylene in hot (180–190° F.) toluol and applied in the same manner as outlined in Example I.

EXAMPLE III

| | Per cent |
|---|---|
| Polymerized ethylene | 26.0 |
| Titanium dioxide extended on a barium sulfate base in the ratio of 30 to 70 | 10.0 |
| Polypropylene glycol sebacate[1] | 4.0 |
| Toluol | 60.0 |

[1] A suitable plasticizer of this type is sold as "Paraplex G25" by Resinous Products and Chemical Co., Philadelphia, Pa.

The above composition is employed where an extremely flexible coating is required, and as will be seen, contains about 15.4% plasticizer based on the weight of the polymer of ethylene. The polypropylene glycol sebacate plasticizer is of the non-migrating type and will have appreciably no effect on the rubber adhesive mass applied on the side of the fabric opposite the coating.

White pigments other than titanium dioxide, such as, e. g., lithopone and zinc oxide may be used with satisfactory results. Colored pigments such as chrome yellow, chrome green, red oxide, ultramarine blue, etc., may be used alone or mixed to produce solid colors or used in conjunction with white pigments to produce tints if desired. Fillers may be used, such as e. g., china clay diatomaceous earth, mica, barytes, etc. for blending with other pigments. The choice of pigments depends upon the desired color of the waterproof coating. Pigments which contain copper and manganese are ordinarily to be avoided since these elements have a deleterious effect on rubber usually present in the pressure-sensitive adhesive.

While the examples show a base fabric of a particular construction, it is to be understood that other flexible fabrics may be used and a wide variation of fabrics, including unwoven fabrics and paper, is within the scope of this invention. Flexible fabrics made from synthetic fibers, such as e. g., nylon, rayon, glass, etc., both woven and non-woven, may be used for the purpose of this invention.

The primary advantage of this invention is that it provides a substantially chemically inert, flexible, waterproof coating for adhesive tape backing which does not require the use of plasticizers to migrate into the rubber adhesive mass while the waterproof coating is in direct contact with the rubber adhesive mass. A further advantage is that the waterproof coating can be sterilized without changing the properties of the coating or the pressure-sensitive adhesive.

It is apparent that many widely different embodiments of this invention may be made without departing from the spirit and scope thereof, and it is not intended to be limited except as indicated in the appended claims.

We claim:

1. A washable heat-sterilizable surgical adhesive tape which comprises a light-weight textile fabric base coated on one side with a substantial layer of a rubber pressure-sensitive adhesive composition and coated on the opposite side with an adherent pigmented waterproofing film consisting essentially of a solid homo polymer of ethylene, pigment, and plasticizer, the said plasticizer being polypropylene glycol sebacate present in amount not more than 15.4%, based on the weight of the said polymer of ethylene.

2. The article of claim 1 in which the waterproofing film contains about equal parts of a solid homo polymer of ethylene and titanium dioxide pigment.

DORMAN McBURNEY.
RAYMOND E. THOMAS.

REFERENCES CITED

The following references are of record in the file of this patent:

UNITED STATES PATENTS

| Number | Name | Date |
|---|---|---|
| 839,383 | Hall | Dec. 25, 1906 |
| 2,118,101 | Nollau et al. | May 24, 1938 |
| 2,201,877 | Anderson | May 21, 1940 |
| 2,241,384 | Bateman et al. | May 13, 1941 |
| 2,369,471 | Latham | Feb. 13, 1945 |
| 2,411,237 | Turner et al. | Nov. 19, 1946 |
| 2,458,166 | Homeyer | Jan. 4, 1949 |
| 2,491,923 | Johnson | Dec. 20, 1949 |

FOREIGN PATENTS

| Number | Country | Date |
|---|---|---|
| 576,411 | Great Britain | Apr. 2, 1946 |

OTHER REFERENCES

Myers, "Polyethylene," article appearing in "Plastics" magazine, Sept. 1944, pgs. 39, 40, 42 and 43.